United States Patent

Peterson

[15] 3,691,536

[45] Sept. 12, 1972

[54] VARIABLE LENGTH STORING DEVICE

[72] Inventor: John L. Peterson, Chicago, Ill.

[73] Assignee: Teletype Corporation, Skokie, Ill.

[22] Filed: Oct. 9, 1970

[21] Appl. No.: 79,593

[52] U.S. Cl......340/173 RC, 235/92 SH, 235/92 NG, 340/172.5, 340/173 FF

[51] Int. Cl...........................G11c 21/00, G11c 19/00

[58] Field of Search.......235/92 SH, 92 NG; 340/173 RC, 340/173 FF, 172.5

[56] References Cited

UNITED STATES PATENTS 2,961,535 11/1960 Lanning..............340/173 RC 3,311,891 3/1967 Brady..................340/173 RC 3,587,062 6/1971 Jen.......................340/173 RC 3,488,635 1/1970 Sifferlen..............340/173 RC

*Primary Examiner*—Bernard Konick

*Assistant Examiner*—Stuart Hecker

*Attorney*—J. L. Landis and R. P. Miller

[57] ABSTRACT

A system for controlling the operation of a recirculating memory having a binary counter to indicate the address of data in the memory, including two storage stages in the recirculating path of the memory, with gating to deliver timing pulses to the two storage stages so as to cause them selectively to provide two, one, or zero elements of data storage in the recirculation of data in order to influence the phasing between the recirculating memory and the binary counter.

12 Claims, 1 Drawing Figure

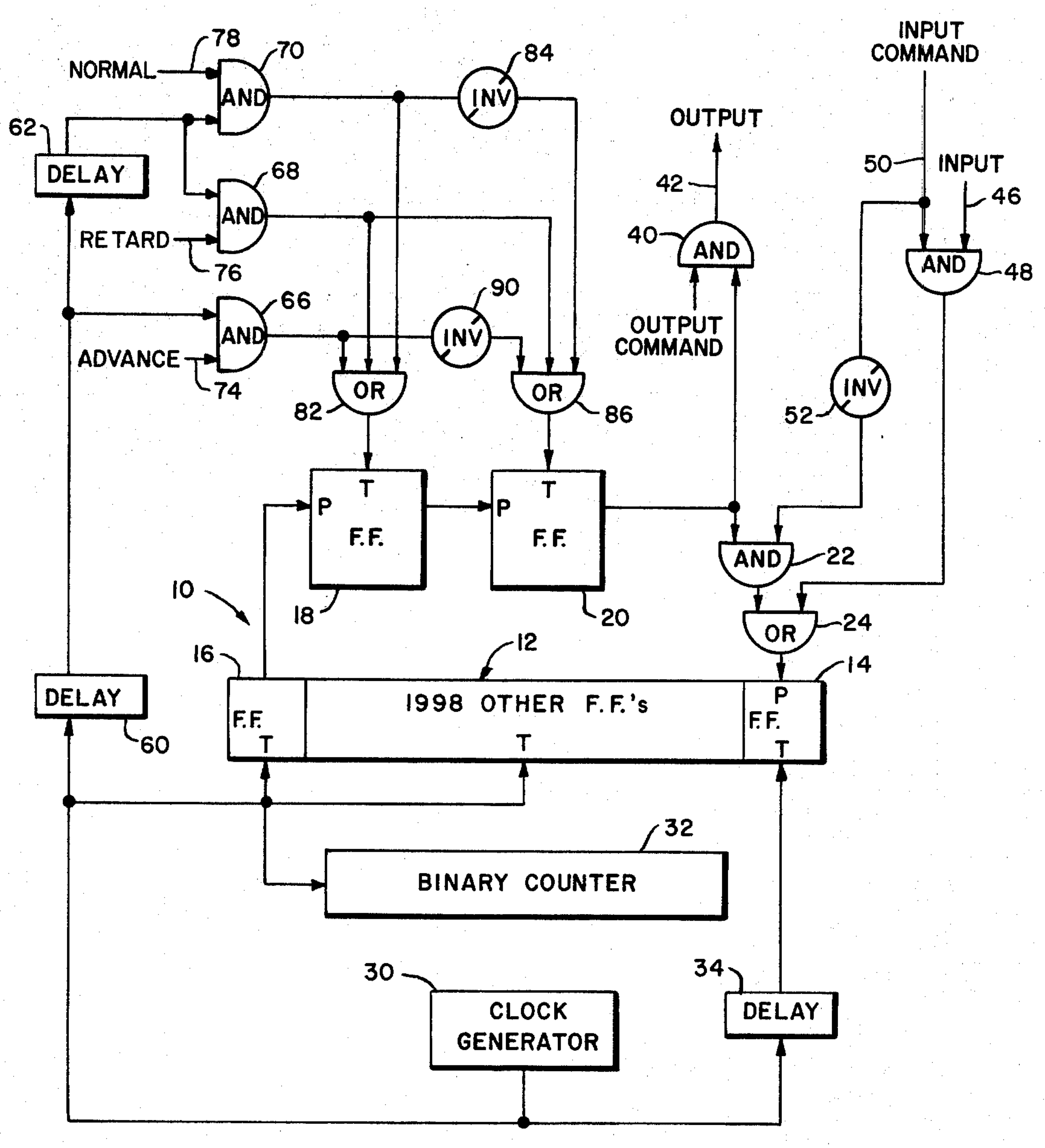
INVENTOR
JOHN L. PETERSON
BY [signature]
ATTORNEY

VARIABLE LENGTH STORING DEVICE

FIELD OF THE INVENTION

The present invention relates to recirculating memory devices and more particularly to controlling the phasing of data within a recirculating memory device. The invention also relates to variable-capacity storage devices, particularly useful in such phasing control.

BACKGROUND OF THE INVENTION

In cathode ray tube devices which display alphanumeric information in a page-like format, the information displayed on the phosphorescent screen of the cathode ray tube is preferably refreshed at frequent intervals. To accomplish this refresh function, a recirculating memory is customarily used. Such a refresh memory normally has as many memory stages as there are alphanumeric characters and spaces on the cathode ray tube screen.

In editing the display of the cathode ray tube, it is desirable to utilize a cursor element which makes some indication on the face of the tube to inform the operator where in the text that the next input signal will be displayed. Such a cathode ray tube display and cursor system is disclosed in the commonly-assigned copending application Ser. No. 833,452, now U.S. Pat. No. 3,609,749, filed on June 16, 1969, in the name of Walter B. McClelland. In order to edit the displayed information, it is necessary to separate adjacent characters or to bring separated characters together to delete intermediate characters. The location of a character on the face of the cathode ray tube is dictated by the location of the representation of that character in the recirculating memory with respect to a binary counter indication. The binary indication of the recirculating memory being related to the beginning of a raster trace of the cathode ray tube. In order to separate or close characters on the display, it is necessary to change the phasing of certain of these characters with respect to the binary indication of the recirculating memory.

Therefore, it is an object of the present invention to control and manipulate the phasing of data within a recirculating memory system.

It is also an object of the present invention to regulate the amount of data stored in a storing device.

It is another object of the present invention to regulate the speed at which information is advanced through a storing device.

SUMMARY OF THE INVENTION

The present invention relates to a variable-capacity storing device having a plurality of stages for advancing data from an input to an output in response to timing pulses supplied at regular intervals and for selectively coupling the timing pulses to the storing stages for regulating the amount of data stored in the storing facilities.

BRIEF DESCRIPTION OF THE DRAWING

The present invention may be more readily understood by referring to the following detailed description, when considering in conjunction with the accompanying drawing which shows a schematic block diagram of a system according to the present invention.

DETAILED DESCRIPTION

Referring now to the drawing, there is shown a recirculating memory 10 comprising 1,998 bistable multivibrators or flip-flops 12 plus an input flip-flop 14 and an output flip-flop 16, for a total of 2,000 flip-flops. The flip-flops used herein may preferably be of the type disclosed in U.S. Pat. No 3,322,896 granted on May 30, 1967 to F. D. Biggam. Such a flip-flop can be set by first conditioning or priming a D.C. priming input or pair of inputs in accordance with the desired information. A subsequent positive-going voltage transition applied to a trigger input causes the flip-flop to assume the state to which it was primed. However, it will be understood that while discrete components can be used, integrated circuit components and groups of components are also suitable.

The information contained in the output flip-flop 16 of the recirculating memory 10 is normally delivered to a recirculation path comprising a first flip-flop 18 which is capable of storing the information contained in the output flip-flop 16. The output of the first flip-flop 18 delivers this information to a second flip-flop 20. The output of the second flip-flop 20 is connected to a normally-conducting AND-gate 22 which delivers its output to an OR-gate 24. The output of the OR-gate 24 is delivered directly to the input flip-flop 14 of the recirculating memory 10. The flip-flops 18 and 20 comprise a two-stage shift register.

In the normal recirculating operation of the memory 10, a data or information bit passes from the input flip-flop 14, through the 1,998 flip-flops 12 to the output flip-flop 16 and then to the first flip-flop 18, the second flip-flop 20, the AND-gate 22, and the OR-gate 24, back to the input flip-flop 14. While the recirculating memory 10 shows 2,000 bits of storage, it will be understood tat the recirculating memory 10 can be duplicated several times such that the handling of each bit in the preferred embodiment can actually represent the handling of one binary word or alphanumeric character.

Data bits are advanced through the recirculating memory by advance or clock pulses supplied at regular intervals by a clock generator 30. Each clock pulse comprises a voltage transition of one polarity (preferably positive) followed shortly thereafter by a voltage transition of the opposite polarity. The output of the clock generator 30 is delivered to a binary counter 32 in addition to being delivered to the flip-flops 12 and 16. Since there are 2,000 flip-flops in the memory plus the two flip-flops 18 and 20, it has been found advantageous to arrange the binary counter 32 such that it will recycle and reset itself to its initial condition after every 2,001 clock pulses received from the clock generator 30.

Assuming that the two flip-flops 18 and 20 are arranged to store only one element of data between the output flip-flop 16 and the input flip-flop 14, the binary counter 32 will recycle in synchronism with the data circulating in the recirculating memory 10. Therefore, when the binary counter 32 resets to its initial condition, the same element of data will always be present in the flip-flops 18 and 20. In connection with a cathode ray tube display, the reset of the counter 32 triggers the beginning of a raster trace of the tube. The element of data in the flip-flops 18 and 20 is then associated with the character in the upper left-hand corner of the tube face.

In the operation of the recirculating memory 10, it has been found most desirable to set the input flip-flop 14 somewhat before all of the other flip-flops 12 and 16 of the recirculating memory are set. This is accomplished by a delay circuit 34 which receives the clock pulses generated by the clock generator 30 and generates a timing pulse approximately midway between successive clock pulses from the clock generator 30. The intermediate timing pulses from the delay circuit 34 are then used to cause the input flip-flop 14 to be set to the condition dictated by the output of the OR-gate 24 at some time between successive outputs of the clock generator 30.

INPUT/OUTPUT CIRCUIT

While it is not a part of the present invention, in order to operate a complete system, provision must be made for removing or reading data from the recirculating memory 10 and for adding new data to the recirculating memory. The output function is accomplished using an output AND-gate 40 which receives one of its inputs from the output of the second flip-flop 20. Upon receipt of an output command signal at its other input, the output AND-gate 40 gates the output of the second flip flop 20 to an output terminal 42 which is connected to a utilization device (not shown). That utilization device is preferably the character generating logic of the cathode ray display system. The output from the memory is non-destructive. The output of the flip-flop 20 is therefore used to refresh the display and is also recirculated for later use.

When data are to be entered into the recirculating memory 10 from an input terminal 46, an input command signal is delivered to an input AND-gate 48 which derives one of its inputs from the input terminal 46 and the other input from an input command terminal 50. An inverter 52 normally delivers an enabling signal to the recirculating AND-gate 22. However, upon the receipt of an input command signal at the input command terminal 50, the inverter 52 removes the enabling signal from the recirculating AND-gate 22, thereby preventing the recirculation of data from the output of the second flip-flop 20 to the input flip-flop 14. The data not recirculated are thus destroyed. Therefore, whatever data are available at the input terminal 46, these data are then sent through the input AND-gate 48 to the input OR-gate 24 for circulation through the recirculating memory 10. Removal of the input command signal at the terminal 50 then disables the input AND-gate 48 and enables the recirculating AND-gate 22 to permit the recirculation of subsequent data present at the output of the second flip-flop 20.

PHASING CONTROL

In describing the operation of the binary counter 32, it was assumed that only one element of data would be stored in the flip-flops 18 and 20. This would maintain synchronism between the recirculating data and the binary counter 32. However, if it is desired that this phasing relationship be altered, the flip-flops 18 and 20 must be made to accomplish less storage or more storage. In other words the flip-flops 18 and 20 must advance data from the output flip-flop 16 to the input flip-flop 14 faster or slower than the condition previously assumed. This is accomplished by providing two addition delay circuits 60 and 62. The delay 60 is of shorter duration than the delay 34. The delay 62 is set by the output of the delay 60 which delivers its output to the delay 62, causing the delay 62 to generate a timing pulse which occurs after the timing pulse generated by the delay 34. Therefore, after each clock pulse issues from clock generator 30, the delay 60 first issues a timing pulse, then the delay 34 issues a second timing pulse, then the delay 62 issues a third timing pulse. The timing pulses issued by the clock generator and the delays 34, 60 and 62 are all of sufficiently short duration that no overlap takes place and both the positive and negative transitions of a timing pulse occur before the first or positive transition of the succeeding timing pulse.

The output of the delay 60 is delivered to an advance AND-gate 66. The output of the delay 62 is delivered to a retard AND-gate 68 and to a normal AND-gate 70. The terms "advance, retard, and normal" indicate the speed with which data should be stepped through the flip-flops 18 and 20. The other input of each of the AND-gates 66, 68, and 70 is derived from external command terminals 74, 76, and 78, respectively.

In the absence of an "advance" command or a "retard" command to change the phasing of the recirculating memory 10, a "normal" speed command signal is generated at the normal terminal 78 to cause the flip-flops 18 and 20 to provide one data unit of storage between the output flip-flop 16 and the input flip-flop 14.

NORMAL OPERATION

Under the normal operation assumed previously, after each timing pulse from the delay, a timing pulse issuing from the delay 62 passes through the normal AND-gate 70 and is delivered to a first OR-gate 82. Therefore, the first transition of the timing pulse issued by the delay circuit 62 passes through the first OR-gate 82 and sets the flip-flop 18 to the binary condition present at the output flip-flop 16. An inverter 84 causes the second or negative-going transition of the timing pulse issued from the delay 62 to become a positive-going transition so as to pass through a second OR-gate 86 which may have A.C. coupled inputs. This timing pulse then causes the second flip-flop 20 to accept the information just previously entered into the first flip-flop 18.

Since the timing pulse issuing from the delay circuit 62 occurs somewhat after the timing pulse issues from the delay circuit 34, the data entered into the flip-flop 20 will remain in the flip-flop 20 and will not immediately be set into the input flip-flop 14. Subsequently, the next clock pulse generated by the clock generator 30 causes the data previously entered in the input flip-flop 14 to be advanced one step through the flip-flops 12. A new element of data then exists in the output flip-flop 16. After that clock pulse has issued from the clock generator 30, the delay 60 delivers a timing pulse to the advance AND-gate 66 which is disabled by the absence of an advance command at the advance terminal 74. The timing pulse from the delay circuit 60 also energizes the delay circuit 62. After that timing pulse has issued from the delay circuit 60, a timing pulse issues from the delay circuit 34 which sets the input flip-flop 14 of the recirculating memory 10 to the condition then existing at the second flip-flop 20. Subsequently, the delay circuit 62 delivers a timing pulse to the AND-gate 68 and 70. The AND-gate 68 is disabled for lack of an input from the retard terminal 76. However, the timing pulse from the delay circuit 62 passes through the energized normal AND-gate 70 and causes the first flip-flop 18 to accept the new element of data then available in the output flip-flop 16. The inverter 84 subsequently causes this element of data to be advanced immediately into the second flip-flop 20, where it will stay until the next output of the delay circuit 34.

This mode of operation corresponds to the normal operation for refreshing the display of a cathode ray tube.

ADVANCE OPERATION

If it is desired to advance the information in the recirculating memory 10 with respect to the resetting of the binary counter 32, an advance command signal is sent from the advance terminal 74 to the AND-gate 66. Simultaneously, the normally-present normal command at the terminal 78 is removed, thereby disabling the AND-gate 70. In the operation of the circuit under control of the advance AND-gate 66, a timing pulse that is generated by the delay 60 is used to set the first flip-flop 18 immediately after the clock pulse is issued from the clock generator 30. An inverter 90 immediately advances that element of data to the second flip-flop 20 where it is then available. A timing pulse is generated by the delay 34 immediately after the timing pulse has been generated by the delay 60 and causes the data present in the flip-flop 20 to be entered immediately into the input flip-flop 14 of the recirculating memory. Therefore, the two flip-flops 18 and 20 effectively perform no storage function since the output of the flip-flop 20 is the same as the output of the flip-flop 16 at the time that this data bit is entered into the input flip-flop 14. Therefore, under advance operation, only 2,000 elements of storage exists in the complete loop of the recirculating memory 10 causing the recirculating memory 10 to recycle slightly faster than the 2,001-count binary counter 32.

This mode of operation is most useful to close or bring closer together characters that are separated on the tube face. In editing, this is most useful in eliminating one or more unwanted characters in a text. For example, the cursor can be set to the character to be eliminated. When the counter 32 reaches the corresponding count, the fast operation begins and thus squeezes out the unwanted character and advances the succeeding characters to close the gap that would otherwise result from a simple erasure. Advance operation would then cease at the end of that raster trace.

RETARD OPERATION

If it is desired to delay the recirculation of data in the recirculating memory 10 with respect to the recycling of the binary counter 32, a retard command signal generated at the retard terminal 76 energizes the retard AND-gate 68. Simultaneously, the normal command signal from the normal terminal 78 is removed, thereby disabling the normal AND-gate 70. When a clock pulse is generated by the clock generator 30, and an element of data is available in the output flip-flop 16, the first timing pulse is generated by the delay 60 and the second timing pulse is generated by the delay 34 to set the input flip-flop 14 to whatever data bit is available at the output of the flip-flop 20. The third timing pulse is then generated by the delay 62. This timing pulse passes through the retard AND-gate 68 and sets the flip-flops 18 and 20 simultaneously. Under these conditions of simultaneous triggering or setting of the flip-flops 18 and 20, the flip-flop 20 assumes the previous state of the flip-flop 18 and the flip-flop 18 simultaneously assumes the condition of the output flip-flop 16.

Therefore, it can be seen that under the "retard" mode of operation a unit of data requires two clock-pulse-durations to advance from the output flip-flop 16 to the input flip-flop 14. Therefore, the total recirculation loop of the recirculating memory 10 then has 2,002 stages, yet the binary counter 32 recycles after 2,001 clock pulses. Consequently, at each cycle of the binary counter, the recirculating memory 10 falls one clock count further behind the binary counter.

Such a mode of operation is useful in inserting characters into a text. If a new character is to be inserted between two adjacent, desired characters, these two adjacent characters must be separated without erasing one of them. This can be accomplished by setting the cursor on the desired location. When the refresh operation reaches the cursor location, the new character is entered through the OR-gate 48 and the retard terminal 76 is simultaneously energized. Therefore, each subsequent character of the display is delayed by one clock pulse duration. At the end of the raster trace, the retard operation is terminated.

Although a particular embodiment of the invention is shown in the drawing and has been described in the foregoing specification, it is to be understood that other modifications of this invention, varied to fit particular operating conditions will be apparent to those skilled in the art; and the invention is not to be considered limited to the embodiment chosen for purposes of disclosure, and covers all changes and modifications which do not constitute departures from the true scope of the invention.

What is claimed is:

1. An improved system for controlling the phasing of the data within a recirculating memory wherein data are entered into the memory at an input and are obtained from the output, having a path for selectively recirculated data from the output to the input of the memory, the data being advanced through the memory in synchronism with clock pulses and further having a counter operated by the clock pulses to indicate cycling of the memory, wherein the improvement comprises:

means in the recirculation path for storing data obtained from the output of the memory and for subsequently delivering the data to the input of the memory;

means for generating timing pulses in synchronism with the clock pulses;

means for coupling the timing pulse means to the storing means for clocking The advancement of data through the storing means; and means for altering the coupling of the timing pulse means to the storing means for changing the clocking of the advancement of data through the storing means, thereby changing the effective size of the storing means.

2. A system according to claim 1 wherein the coupling means includes means for generating an inverse of the timing pulses.

3. A system according to claim 1 wherein the storing means comprises a plurality of bistable multivibrators.

4. A system according to claim 3 wherein the plurality of bistable multivibrators comprise two bistable multivibrators arranged as a two-stage shift register.

5. A system according to claim 1 wherein the coupling means comprises means for regulating the amount of data stored in the storing means by regulating the speed at which data are advanced through the storing means.

6. A system according to claim 5 wherein the coupling means comprises means for selectively advancing data through the storing means from the output of the recirculating memory to the input of the recirculating memory within the interval between successive clock pulses.

7. A system according to claim 5 wherein the coupling means comprises means for selectively advancing data through the storing means from the output of the recirculating memory to the input of the recirculating memory in greater than the interval between successive clock pulses.

8. A system according to claim 1 wherein the generating means comprises means for generating at least one timing pulse between successive clock pulses.

9. A system according to claim 8 wherein the generating means comprises:

means for generating a first timing pulse after each clock pulse; and means for generating a second timing pulse after each first timing pulse but before each succeeding clock pulse.

10. A system according to claim 9 wherein the coupling means comprises:

means for selectively coupling the first timing means to the storing means; and means for selectively coupling the second timing means to the storing means.

11. A system according to claim 10 wherein the first and second coupling means are mutually exclusive in their operation.

12. A variable-capacity storage device comprising:

multiple element storing means for storing data and for advancing data from an input to an output;

means for supplying timing pulses at regular intervals;

means for supplying pulses which are the inverse of the timing pulses; and means for gating the timing pulses to all elements of the storing means and alternatively gating the timing pulses to alternate elements of the storing means and inverse timing pulses to the other alternate elements of the storing means.

* * * * *